United States Patent
Frenock

(10) Patent No.: US 11,112,888 B2
(45) Date of Patent: Sep. 7, 2021

(54) PRESSURE SENSITIVE STYLUS

(71) Applicant: Hewlett-Packard Development Company, L.P., Houston, TX (US)

(72) Inventor: James Frenock, Lebanon, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 375 days.

(21) Appl. No.: 15/567,327

(22) PCT Filed: Jul. 15, 2015

(86) PCT No.: PCT/US2015/040546
§ 371 (c)(1),
(2) Date: Oct. 17, 2017

(87) PCT Pub. No.: WO2017/011001
PCT Pub. Date: Jan. 19, 2017

(65) Prior Publication Data
US 2018/0088689 A1 Mar. 29, 2018

(51) Int. Cl.
*G06F 3/0354* (2013.01)
*G06F 3/03* (2006.01)
*G06F 3/033* (2013.01)
*G06F 3/0487* (2013.01)
*G06F 3/0488* (2013.01)

(52) U.S. Cl.
CPC ............ *G06F 3/03545* (2013.01); *G06F 3/03* (2013.01); *G06F 3/033* (2013.01); *G06F 3/0312* (2013.01); *G06F 3/0317* (2013.01); *G06F 3/03541* (2013.01); *G06F 3/0487* (2013.01); *G06F 3/04883* (2013.01)

(58) Field of Classification Search
CPC .... G06F 3/0312; G06F 3/0487; G06F 3/0317; G06F 3/033; G06F 3/03541; G06F 3/03545
USPC ......................................................... 345/179
See application file for complete search history.

(56) References Cited

U.S. PATENT DOCUMENTS

| 4,131,880 A | 12/1978 | Siy et al. |
| 6,188,392 B1 * | 2/2001 | O'Connor ........... G06F 3/03545 178/18.01 |
| 7,872,641 B2 * | 1/2011 | Abileah ................ G06F 3/0412 345/173 |

(Continued)

FOREIGN PATENT DOCUMENTS

| WO | WO-2014-188417 A2 | 11/2010 |
| WO | WO-2013-069915 A1 | 5/2013 |

OTHER PUBLICATIONS

Joseph Flaherty, "Pressure-Sensitive Stylus Gives Starving IPAD Artists Incredible Control," Jan. 10, 2013, pp. 1-9, Wired.com.

*Primary Examiner* — Kwin Xie
(74) *Attorney, Agent, or Firm* — Brooks Cameron & Huebsch PLLC

(57) ABSTRACT

In one implementation, a pressure sensitive stylus may receive, at a controller, drawing area coordinates, a stroke pressure from a voltage generated by a piezoelectric crystal, and a stylus coordinate direction from a plurality of fiber optic sensors, determine a drawing area from a wireless signal frequency corresponding to the drawing area coordinates, determine a drawing mode of a stylus stroke, wherein the drawing mode includes a stylus coordinate direction and a stylus stroke type, and transmit the drawing area and the stylus stroke.

15 Claims, 3 Drawing Sheets

(56) References Cited

U.S. PATENT DOCUMENTS

| | | | |
|---|---|---|---|
| 2002/0163511 A1* | 11/2002 | Sekendur | G06F 3/0321 345/179 |
| 2003/0214490 A1* | 11/2003 | Cool | G06F 3/03545 345/179 |
| 2004/0150632 A1* | 8/2004 | Clapper | G06F 3/03545 345/179 |
| 2006/0028456 A1* | 2/2006 | Kang | G06F 3/0312 345/179 |
| 2007/0002013 A1* | 1/2007 | Kong | G06F 3/0312 345/157 |
| 2009/0109177 A1 | 4/2009 | Zloter et al. | |
| 2009/0267891 A1* | 10/2009 | Ali | G06F 1/1637 345/107 |
| 2010/0006350 A1* | 1/2010 | Elias | G06F 3/03545 178/18.06 |
| 2010/0051356 A1 | 3/2010 | Stern et al. | |
| 2011/0096024 A1* | 4/2011 | Kwak | G06F 3/044 345/174 |
| 2011/0102379 A1 | 5/2011 | Lapstun et al. | |
| 2011/0304577 A1* | 12/2011 | Brown | G06F 3/03545 345/174 |
| 2012/0086675 A1 | 4/2012 | Raif et al. | |
| 2014/0022193 A1* | 1/2014 | Kim | G06F 3/044 345/173 |
| 2014/0078109 A1* | 3/2014 | Armstrong-Muntner | G06F 3/03542 345/175 |
| 2015/0015549 A1* | 1/2015 | Lu | G06F 3/03545 345/179 |
| 2015/0029161 A1 | 1/2015 | Koo et al. | |
| 2017/0083096 A1* | 3/2017 | Rihn | G06F 3/0416 |
| 2017/0115515 A1* | 4/2017 | Miyake | G02F 1/13718 |

\* cited by examiner

PRESSURE SENSITIVE STYLUS

BACKGROUND

A stylus may be used in many digital applications. Digital artists can utilize a stylus to create and/or edit digital media. Educators can utilize a stylus for interactive classroom learning. A stylus can also be utilized to enhance digital workflow and improve visual communication in the workplace.

DETAILED DESCRIPTION

Figure 1:
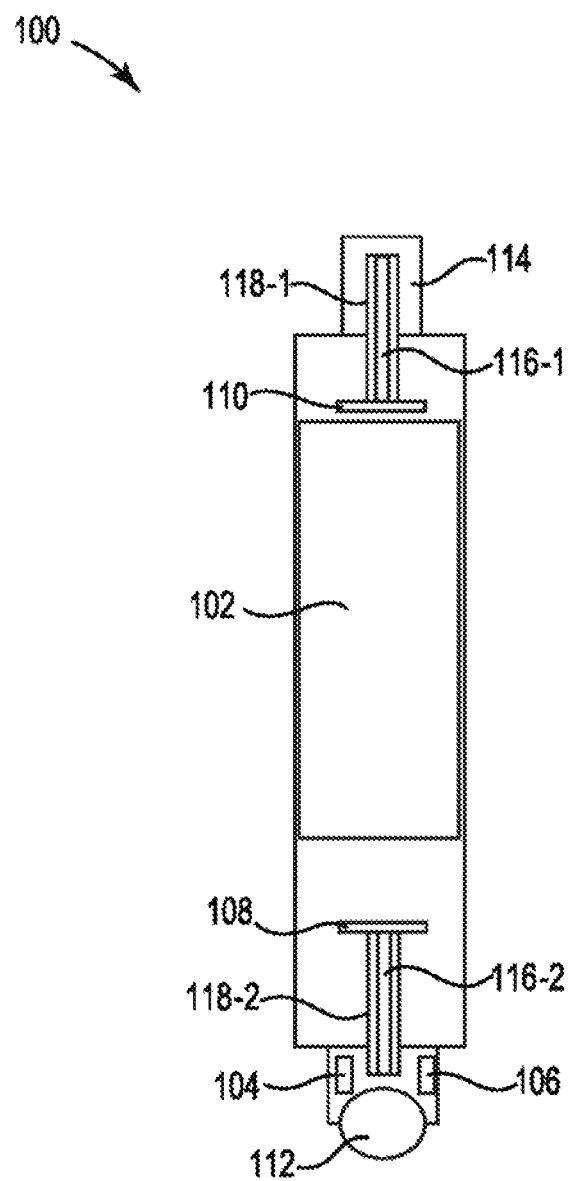
FIG. 1 illustrates a diagram of an example of a pressure sensitive stylus consistent with the present disclosure.

A number of devices, systems, and methods for a pressure sensitive stylus are described herein. A stylus may require the use of a special drawing pad in order to be used. For example, a stylus may only function when used in conjunction with its corresponding tablet. Additionally, a stylus may require the use of proprietary software that can limit the functions of the stylus. Requiring special drawing pads and/or proprietary software can restrict the ability of a stylus to perform certain tasks and constrain the usefulness of the stylus. Potential users may be discouraged from utilizing a stylus because of these restrictions.

As used herein, a pressure sensitive stylus may refer to a stylus that may capture handwriting and/or brush strokes of a user and convert the strokes to digital information that may be used by various applications. That is, a pressure sensitive stylus may be a stylus that may receive, at a controller, drawing area coordinates, a stroke pressure from a voltage generated by a piezoelectric crystal, and a stylus coordinate direction from a plurality of fiber optic sensors, determine a drawing area from a wireless signal frequency corresponding to the drawing area coordinates, determine a drawing mode of a stylus stroke, wherein the drawing mode includes a stylus coordinate direction and a stylus stroke type, and transmit the drawing area and the stylus stroke.

FIG. 1 illustrates a diagram of an example of a pressure sensitive stylus 100 consistent with the present disclosure. The pressure sensitive stylus 100 may include a controller 102, a first fiber optic sensor 104, a second fiber optic sensor 106, a first piezoelectric crystal 108, a second piezoelectric crystal 110, a trackball 112, an eraser head 114, a connecting rod 116-1, 116-2, and a spring 118-1, 118-2.

As used herein, a fiber optic sensor may be a sensor that uses optical fiber as a sensor (e.g., first transmitter of first fiber optic sensor 104, second transmitter of second fiber optic sensor 106) and/or as a way of relaying signals from a sensor to controller 102. Additionally, as used herein, optical fiber may include a flexible fiber used as a way to transmit signals between two ends of the flexible fiber via transmission of light between two ends of the flexible fiber.

First piezoelectric crystal 108 may generate a first voltage corresponding to a stroke pressure from trackball 112. A user may utilize pressure sensitive stylus 100 by applying trackball 112 of pressure sensitive stylus 100 to a surface. As used herein, the surface may refer to a surface on which pressure sensitive stylus 100 may be pressed to generate a stylus stroke. For example, the surface may be a table, desk top, and/or a mobile device screen, although examples of the disclosure are not so limited.

As used herein, a piezoelectric crystal may be a material that accumulates an electric charge in response to applied mechanical stress. For example, a pressure applied to a piezoelectric crystal may cause an electric charge to accumulate across the piezoelectric crystal.

In some examples, first piezoelectric crystal 108 and second piezoelectric crystal 110 may be naturally occurring materials such as quartz, berlinite, sucrose, or topaz. However, examples of the disclosure are not so limited. For example, first piezoelectric crystal 108 and second piezoelectric crystal 110 may be other naturally occurring piezoelectric crystal materials.

In some examples, first piezoelectric crystal 108 and second piezoelectric crystal 110 may be synthetic materials such as synthetic crystals (e.g., langasite or gallium orthophosphate) or synthetic ceramics (e.g., barium titanate, lead zirconate titanate, potassium niobate, sodium tungstate, or lithium niobate). However, examples of the disclosure are not so limited. For example, first piezoelectric crystal 108 and second piezoelectric crystal 110 may be other types of synthetic materials or synthetic crystals.

The user may apply a stroke pressure to pressure sensitive stylus 100 to cause first piezoelectric crystal 108 to generate a first voltage. A stroke pressure, as used herein, may refer to the pressure a user of pressure sensitive stylus 100 may apply to trackball 112 or eraser head 114, as will be further described herein. The resulting voltage generated by first piezoelectric crystal 108 or second piezoelectric crystal 110, respectively, may correspond to the stroke pressure, as will be further described herein.

The first voltage generated by the stroke pressure from trackball 112 may correspond to a write stroke. For example, a user applying trackball 112 to a surface may cause a stroke pressure that may cause pressure sensitive stylus 100 to generate a write stroke to be transmitted to a computing device (e.g., computing device 332, as described in connection with FIG. 3). A write stroke may be a stylus stroke type, as will be further described herein.

Trackball 112 may be connected to first piezoelectric, crystal 108 by a spring 118-2 and a connecting rod 116-2. For example, a stroke pressure applied to pressure sensitive stylus 100 may cause a reactive force in response to the stroke pressure from trackball 112 to be translated through spring 118-2 and connecting rod 116-2 to cause first piezoelectric crystal 108 to generate a first voltage.

In some examples, spring 118-2 may be a helical coil spring coiled around connecting rod 116-1 such that the stroke pressure applied to pressure sensitive stylus 100 causes trackball 112 to compress spring 118-2 and connecting rod 116-2. For example, a user applying a stroke pressure to cause a write stroke may cause spring 118-2 and connecting rod 116-2 to compress from an equilibrium length during the write stroke, and allow spring 118-2 and connecting rod 116-2 to decompress back to the equilibrium length after the write stroke. As used herein, the equilibrium length of spring 118-1, 118-2 and connecting rod 116-1, 116-2 may be the length of spring 118-1, 118-2 and connecting rod 116-1, 116-2 during which no compressive forces are applied to spring 118-1, 118-2 and connecting rod 116-1, 116-2.

Although spring 118-1, 118-2 are described as being a helical coil spring, examples of the present disclosure are not so limited. For example, spring 118-1, 118-2 may a leaf spring, gas spring, or a balance spring, among other types of springs.

Pressure sensitive stylus 100 may include first fiber optic sensor 104 to sense a first coordinate component of a stylus coordinate direction. The stylus coordinate direction may include a plurality of coordinate components. The stylus coordinate direction may include a first coordinate component of a stylus coordinate direction and a second coordinate component of a stylus coordinate direction, and may be defined by the drawing area coordinates, as will be further described herein.

Although not shown in FIG. 1, first fiber optic sensor 104 may include a first transmitter and a first receiver. The first transmitter of first fiber optic sensor 104 may transmit a signal from controller 102 to sense a first coordinate component of a stylus coordinate direction. The first receiver of first fiber optic sensor 104 may transmit a signal to controller 102 (e.g., from trackball 112) to sense the first coordinate component of a stylus coordinate direction.

Pressure sensitive stylus 100 may include second fiber optic sensor 106 to sense a second coordinate component of a stylus coordinate direction. As described above, the stylus coordinate direction may include a first coordinate component of a stylus coordinate direction and a second coordinate component of a stylus coordinate direction, and may be defined by the drawing area coordinates, as will be further described herein.

Although not shown in FIG. 1, second fiber optic sensor 106 may include a second transmitter and a second receiver. The second transmitter of second fiber optic sensor 106 may transmit a signal from controller 102 to sense a second coordinate component of a stylus coordinate direction. The second receiver of second fiber optic sensor 106 may transmit a signal to controller 102 (e.g., from trackball 112) to sense the second coordinate component of a stylus coordinate direction.

Second piezoelectric crystal 110 may generate a second voltage corresponding to a stroke pressure from eraser head 114. For example, a user ay utilize pressure sensitive stylus 100 by applying eraser head 114 of pressure sensitive stylus 100 to a surface. The user may apply a stroke pressure to pressure sensitive stylus 100 to cause second piezoelectric crystal 110 to generate a second voltage. The resulting voltage generated by second piezoelectric crystal 110 may correspond to the stroke pressure, as will be further described herein.

The second voltage generated by the stroke pressure from eraser head 114 may correspond to an erase stroke. For example, a user applying eraser head 114 to a surface may cause a stroke pressure that may cause pressure sensitive stylus 100 to generate an erase stroke to be transmitted to a computing device (e.g., computing device 332, as described in connection with FIG. 3). An erase stroke may be a stylus stroke type, as will be further described herein.

Eraser head 114 may be connected to second piezoelectric crystal 110 by a spring 118-1 and a connecting rod 116-1. For example, a stroke pressure applied to pressure sensitive stylus 100 may cause a reactive force in response to the stroke pressure from eraser head 114 to be translated through spring 118-1 and, connecting rod 116-1 to cause second piezoelectric crystal 110 to generate a second voltage.

In some examples, spring 118-1 may be a helical coil spring coiled around connecting rod 116-1 such that the stroke pressure applied to pressure sensitive stylus 100 causes eraser head 114 to compress spring 118-1 and connecting rod 116-1. For example, a user applying a stroke pressure to cause an erase stroke, may cause spring 118-1 and connecting rod 116-1 to compress from an equilibrium length during the erase stroke, and allow spring 118-1 and connecting rod 116-1 to decompress back to the equilibrium length after the erase stroke.

Although not shown in FIG. 1, pressure sensitive stylus 100 may include a second trackball located in eraser head 114, a third fiber optic sensor and a fourth fiber optic sensor to sense coordinate components of a stylus coordinate direction of an erase stroke. Similar to the write stroke as described above, the third fiber optic sensor may include a first transmitter and first receiver, and the fourth fiber optic sensor may include a first transmitter and a first receiver, to determine a first and second coordinate component of a stylus coordinate direction of an erase stroke.

Although not shown in FIG. 1, pressure sensitive stylus 100 may include a battery to provide electrical energy to pressure sensitive stylus 100. For example, the battery may provide electrical energy to the controller 102, first fiber optic sensor 104 and second fiber optic sensor 106. The battery may be a rechargeable battery.

Although not shown in FIG. 1, pressure sensitive stylus 100 may include a function button. The function button may modify the drawing mode and/or properties (e.g., stroke width and/or stroke color) of the write stroke and/or the erase stroke, as will be further described in connection with FIG. 2. For example, a user of pressure sensitive stylus 100 may modify the properties of the write stroke and/or erase stroke such as stroke width and/or stroke color using the function button.

The function button may additionally modify the function of trackball 112 and/or eraser head 114. For example, the function button may enable trackball 112 to perform a write stroke and an erase stroke. That is, trackball 112 may perform a write stroke, and subsequently, after the drawing mode having been modified via the function button, perform an erase stroke. As another example, the function button may enable eraser head 114 to perform an erase stroke and a write stroke. That is, eraser head 114 may perform an erase stroke, and subsequently, after the drawing mode having been modified via the function button, perform a write stroke.

Figure 2:
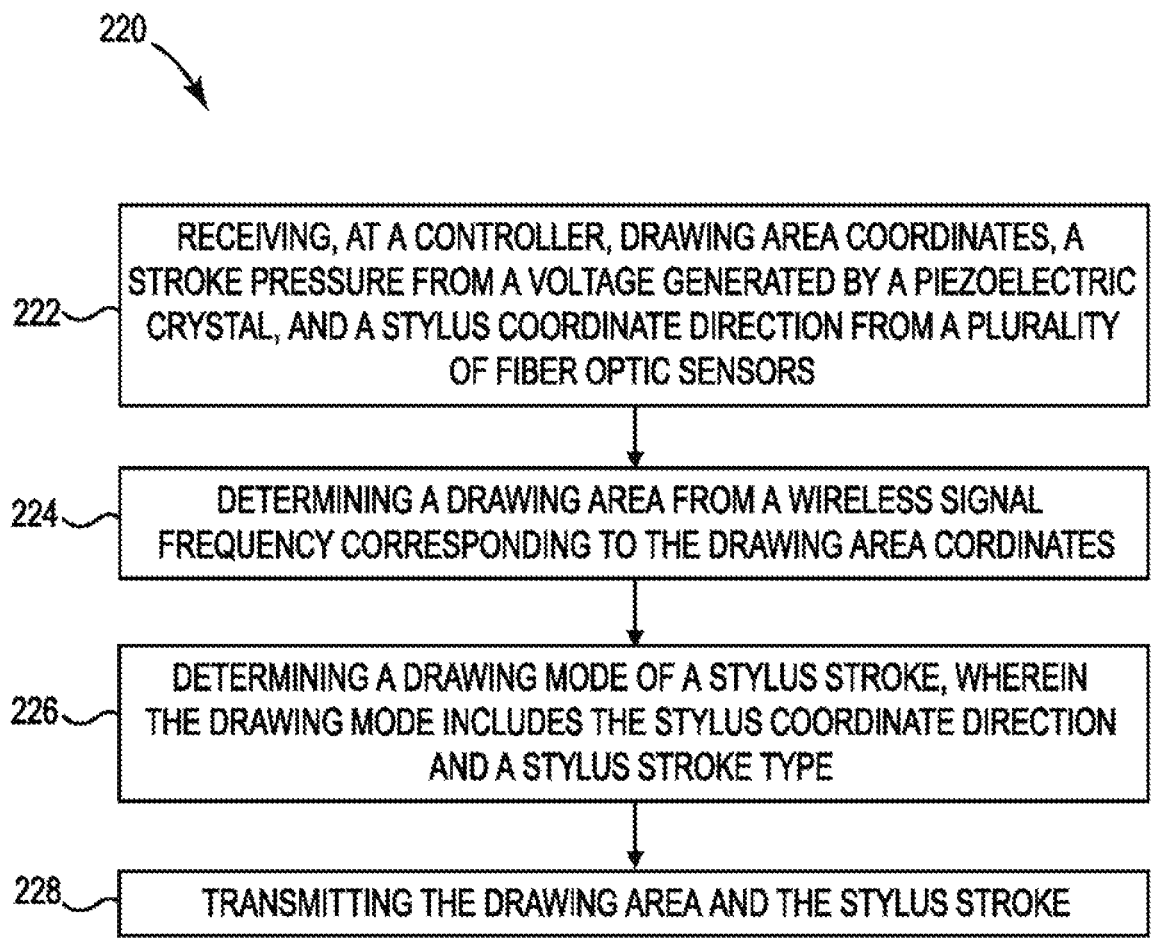
FIG. 2 illustrates a flow chart of an example method of a pressure sensitive stylus consistent with the present disclosure.

FIG. 2 illustrates a flow chart of a method 220 of a pressure sensitive stylus (e.g., pressure sensitive stylus 100 previously described in connection with FIG. 1, pressure sensitive stylus 300 described in connection with FIG. 3) consistent with the present disclosure. For example, method 220 may be performed by a controller (e.g., controller 102 previously described in connection with FIG. 1, controller 302 described in connection with FIG. 3) to transmit a drawing area and a stylus stroke.

As illustrated at 222, the method 220 may include receiving, at controller, drawing area coordinates, a stroke pressure from a voltage generated by a piezoelectric crystal, and a stylus coordinate direction from a plurality of fiber optic sensors.

The stylus coordinate direction may determine a direction of the stylus stroke relative to the drawing area coordinates. For example, the direction of the stylus stroke may be defined by the stylus coordinate direction that includes a plurality of coordinate components. The stylus coordinate direction may be defined by the drawing area coordinates. For example, the drawing area coordinates may define a planar drawing surface described by an X-Y coordinate system. The direction of the stylus stroke may be defined by the stylus coordinate direction that includes an X-coordinate direction and a Y-coordinate direction.

Determining the stylus coordinate direction from the plurality of fiber optic sensors may include determining a first coordinate component of the stylus coordinate direction by a first fiber optic sensor (e.g., first fiber optic sensor 104, previously described in connection with FIG. 1) of the plurality of fiber optic sensors. For example, a first fiber optic sensor may be designated to sense the first coordinate component (e.g., X-coordinate direction) of the direction of a stylus stroke of the pressure sensitive stylus.

Determining the stylus coordinate direction from the plurality of fiber optic sensors may include determining a second coordinate component of the stylus coordinate direction by a second fiber optic sensor (e g, second fiber optic sensor 106, previously described in connection with FIG. 1) of the plurality of fiber optic sensors. For example, a second fiber optic sensor may be designated to sense the second coordinate component (e.g., Y-coordinate direction) of the direction of a stylus stroke of the pressure sensitive stylus.

Determining the first coordinate component and the second coordinate component of the stylus coordinate direction may include sensing the first coordinate component and the second coordinate component from a trackball (e.g., trackball 112, previously described in connection with FIG. 1). For example, a first fiber optic sensor (e.g., first fiber optic sensor 104, previously described in connection with FIG. 1) may sense the first coordinate component (e.g., the X-coordinate component) of the stylus coordinate direction by reflecting light off of the trackball as the trackball rotates in response to a stylus stroke. The light may be transmitted to the trackball by a first transmitter of the first fiber optic sensor and may be received and/or transmitted to the controller by a first receiver of the first fiber optic sensor.

Similar to the first coordinate component, a second fiber optic sensor (e.g., second fiber optic sensor 106, previously described in connection with FIG. 1) may sense the second coordinate component (e.g., the Y-coordinate component) of the stylus coordinate direction by reflecting light off of the trackball as the trackball rotates in response to a stylus stroke. The light may be transmitted to the trackball by a second transmitter of the second fiber optic sensor and may be received and/or transmitted to the controller by a second receiver of the second fiber optic sensor.

As illustrated at 224, the method 200 may include determining a drawing area from a wireless signal frequency corresponding to the drawing area coordinates. The drawing area may be determined by defining the drawing are coordinates. The drawing area of the stylus may include a specified area in which the pressure sensitive stylus may create a stylus stroke.

The drawing area coordinates may define the drawing area of the pressure sensitive stylus. For example, pressure sensitive stylus may create a stylus stroke within the drawing area coordinates. However, the pressure sensitive stylus may not be able to create a stylus stroke outside of the drawing area coordinates.

In some examples, a user may define the drawing area of the pressure sensitive stylus by defining the drawing area coordinates. For example, a user may define a drawing area on a table top by tapping the pressure sensitive stylus to define a rectangular drawing area on the table top. As another example, a user may define a drawing area on a drafting board by drawing the drawing area coordinates on the drafting board.

Although defining the drawing area coordinates is described as tapping the pressure sensitive stylus and/or drawing the drawing area coordinates on a table top or drafting board, examples of the disclosure are not so limited. For example, the drawing area coordinates may be defined on other surfaces using other actions by the pressure sensitive stylus to define the drawing area coordinates.

The drawing area coordinates may correspond to a wireless signal frequency. For example, a wireless signal frequency may be assigned to the drawing area coordinates to define the drawing area of the pressure sensitive stylus. The pressure sensitive stylus may create a stylus stroke within the drawing area defined by drawing area coordinates corresponding to a wireless signal frequency.

In some examples, the wireless signal frequency may be a Bluetooth signal. That is, the pressure sensitive stylus may utilize a wireless Bluetooth frequency to create a stylus stroke within the drawing area coordinates corresponding to the wireless Bluetooth frequency.

In some examples, the wireless signal frequency may be a Wi-Fi signal. That is, the pressure sensitive stylus may utilize a Wi-Fi frequency to create a stylus stroke within the drawing area coordinates corresponding to the Wi-Fi frequency.

Although the drawing area coordinates are described as corresponding to a Bluetooth or Wi-Fi wireless signal frequency, examples of the disclosure are not so limited. For example, the drawing area coordinates may correspond to other wireless signal frequencies.

As illustrated at 226, the method 200 may include determining a drawing mode of a stylus stroke, wherein the drawing mode includes a stylus coordinate direction and a stylus stroke type. The stylus stroke type may include a write stroke and an erase stroke. For example, the pressure sensitive stylus may generate a stylus stroke type that is a write stroke. The write stroke may generate a corresponding mark displayed on a user interface (e.g., user interface 338, described in connection with FIG. 3). As another example, the pressure sensitive stylus may generate a stylus stroke type that is an erase stroke. The erase stroke may erase a mark created by a write stroke that is displayed on the user interface (e.g., user interface 338, described in connection with FIG. 3).

The controller of the pressure sensitive stylus may determine the stylus stroke type based on a voltage generated by a piezoelectric crystal, the voltage determined by the stroke pressure. For example, a first piezoelectric crystal (e.g., first piezoelectric crystal 108, previously described in connection with FIG. 1) may generate a first voltage from a stroke pressure applied to a trackball (e.g., trackball 112, previously described in connection with FIG. 1). The controller may determine the stylus stroke type to be a write stroke based on the first voltage generated by the first piezoelectric crystal. As another example, a second piezoelectric crystal (e.g., second piezoelectric crystal 110, as previously described in connection with FIG. 1) may generate a second voltage from a stroke pressure applied to an eraser head (e.g., eraser head 114, previously described in connection with FIG. 1). The controller may determine the stylus stroke type to be an erase stroke based on the second voltage generated by the second piezoelectric crystal.

The controller of the pressure sensitive stylus may determine a stylus stroke width corresponding to the stroke pressure. The stylus stroke width may vary based on the stroke pressure. For example, the magnitude of a pressure applied to a trackball and/or an eraser head by a stroke pressure may generate a corresponding voltage by a piezoelectric crystal. The corresponding voltage of the piezoelectric crystal may generate a corresponding stroke width of the pressure sensitive stylus.

In some examples, a write stroke may include a stroke pressure to cause the first piezoelectric crystal to generate a voltage corresponding to a write stroke width of 5 millimeters (mm). Additionally or alternatively, a write stroke may include a relatively higher stroke pressure to cause the first piezoelectric crystal to generate a voltage corresponding to a write stroke width of 7 mm.

In some examples, an erase stroke may include a stroke pressure to cause the second piezoelectric crystal to generate a voltage corresponding to an erase stroke width of 5 millimeters (mm). Additionally or alternatively, an erase stroke may include a relatively higher stroke pressure to cause the second piezoelectric crystal to generate a voltage corresponding to an erase stroke width of 7 mm.

As illustrated at 228, the method 200 may include transmitting the drawing area and the stylus stroke. For example, the controller of pressure sensitive stylus (e.g., controller 102, 302) may transmit the drawing area and the stylus stroke to a computing device (e.g., computing device 332). The controller may transmit the drawing area and the stylus stroke by a wireless connection, as will be further described in connection with FIG. 3.

Figure 3:
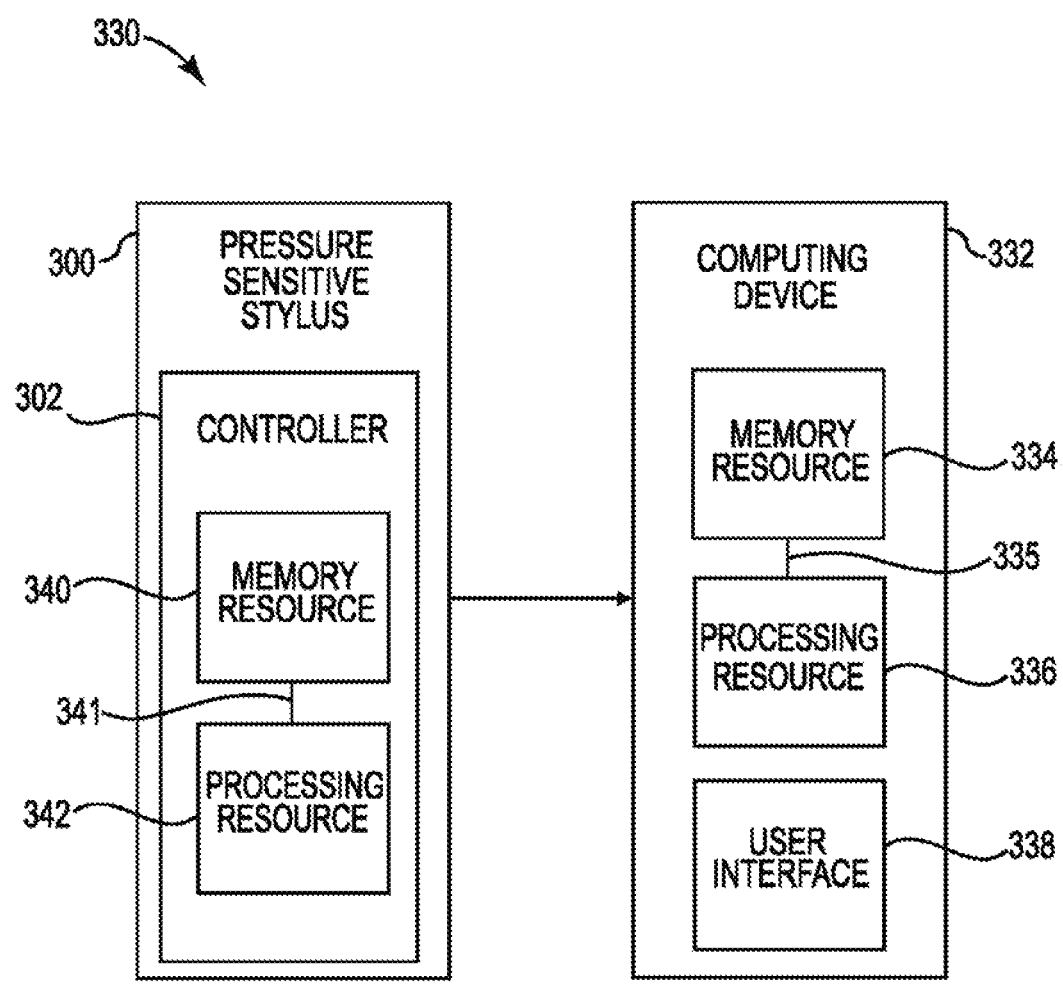
FIG. 3 illustrates an example system for a pressure sensitive stylus consistent with the present disclosure.

FIG. 3 illustrates an example system 330 for a pressure sensitive stylus 300 consistent with the present disclosure. The system 330 may include pressure sensitive stylus 300, controller 302, computing device 332, and user interface 338. Controller 302 may include a memory resource 340 and a processing resource 342. Computing device 332 may include a memory resource 334 and a processing resource 336.

As shown in FIG. 3, pressure sensitive stylus 300 may include a controller 302 to determine a drawing area of pressure sensitive stylus 300 corresponding to drawing area coordinates and a stylus stroke from a stroke pressure, a stylus stroke type, and a stylus coordinate direction.

Computing device 332 may receive the drawing area and the stylus stroke from pressure sensitive stylus 300. For instance, pressure sensitive stylus 300 may transmit the drawing area and the stylus stroke to computing device 332.

Computing device 332 may receive the drawing area and the stylus stroke from pressure sensitive stylus 300 by a wireless connection. The wireless connection may be a network relationship that connects pressure sensitive stylus 300 to computing device 332. Examples of such a network relationship may include a local area network (LAN), wide area network (WAN), personal area network (PAN), a distributed computing environment (e.g., a cloud computing environment), and/or the internet, among other types of network relationships.

Although computing device 332 is described as receiving the drawing area and the stylus stroke from pressure sensitive stylus 300 by a wireless connection, examples of the disclosure are not so limited. For example, computing device 332 may receive the drawing area and the stylus stroke from pressure sensitive stylus 300 by a wired connection.

As shown in FIG. 3, computing device 332 may include a user interface 338 to display the stylus stroke. As used herein, a user interface may include a graphical user interface (GUI) that may include a display (e.g., a screen) that may provide information to a user of pressure sensitive stylus 300 and/or computing device 332. The display may be, for instance, a touch-screen (e.g., the GUI may include touch-screen capabilities). Additionally or alternatively, a display may include a television, computer monitor, mobile device screen, or other type of display device connected to computing device 332. Examples of the disclosure, however, are not limited to a particular type of user interface.

Pressure sensitive stylus 300 and computing device 332 may include hardware, machine readable instructions on a non-transitory machine readable medium, or a combination thereof, to perform the elements described in connection with FIGS. 1-3.

The hardware, for example, may include processing resources 342, 336 and/or memory resources 340, 334 (e.g., computer-readable medium (CRM), machine readable medium (MRM), database, etc.). A processing resource 342, 336, as used herein, may include any number of processors capable of executing instructions stored by memory resources 340, 334. Processing resources 342, 336 may be implemented in a single device or distributed across multiple devices. The machine readable instructions (e.g., computer readable instructions (CRI)) may include instructions stored on the memory resources 340, 334 and executable by the processing resources 342, 336 to implement a desired element (e.g., cause controller 302 to determine a drawing area of pressure sensitive stylus 300 corresponding to drawing area coordinates and a stylus stroke from a stroke pressure, a stylus stroke type, and a stylus coordinate direction, and/or cause computing device 332 to receive the drawing area and the stylus stroke from pressure sensitive stylus 300 and cause user interface 338 to display the stylus stroke, etc.).

The memory resources 340, 334 may be in communication with the processing resources 342, 336, respectively. The memory resources 340, 334, as used herein, may include any number of memory components capable of storing instructions that may be executed by processing resources 342, 336 respectively. Such memory resources 340, 334 may be non-transitory CRM or MRM. Memory resources 340, 334 may be integrated in a single device or distributed across multiple devices. Further, memory resources 340, 334 may be fully or partially integrated in the same devices as processing resources 342, 336, respectively, or they may be separate but accessible to those devices and processing resources 342, 336. Thus, it is noted that the computing device 332 may be implemented on a participant device, on a server device, on a collection of server devices, and/or a combination of the participant device and the server device.

The memory resources 340, 334 may be in communication with the processing resources 342, 336, respectively, via communication links (e.g., a path) 341, 335, respectively. The communication links 341, 335 may be local or remote to the machines (e.g., pressure sensitive stylus 300, computing device 332) associated with the processing resources 342, 336, respectively. Examples of local communication links 341, 335 may include an electronic bus internal to a machine (e.g., a pressure sensitive stylus, a computing device) where the memory resources 340, 334 are one of volatile, non-volatile, fixed, and/or removable storage medium in communication with the processing resources 342, 336 via the electronic bus.

As used herein, "logic" is an alternative or additional processing resource to perform a particular action and/or element described herein. Logic may include hardware. The hardware may include processing resources such as circuitry, which are distinct from machine readable instructions on a machine readable media. Further, as used herein, "a" or "a number of" something may refer to one or more such things. For example, "a number of widgets" may refer to one or more widgets.

The above specification, examples and data provide a description of the method and applications, and use of the system and method of the present disclosure. Since many examples may be made without departing from the spirit and scope of the system and method of the present disclosure, this specification merely sets forth some of the many possible example configurations and implementations.

What is claimed is:

1. A method for a pressure sensitive stylus, comprising:
receiving at a controller within the pressure sensitive stylus:
a predetermined voltage that corresponds to a pressure of a stylus stroke applied on a write tip of the pressure sensitive stylus or an erase tip of the pressure sensitive stylus, wherein the write tip of the pressure sensitive stylus is coupled to a first piezoelectric crystal that generates a first voltage when a pressure is applied on the write tip, and the erase tip of the pressure sensitive stylus is coupled to a second piezoelectric crystal that generates a second voltage when a pressure is applied on the erase tip; and
a stylus coordinate direction from a plurality of fiber optic sensors in the pressure sensitive stylus;
determining, by the controller, a type of the stylus stroke based on whether the predetermined voltage is the first voltage generated by the first piezoelectric crystal or the second voltage generated by the second piezoelectric crystal, wherein the type of the stylus stroke is a write stroke performed by the write tip or an erase stroke performed by the erase tip;
determining, by the controller, a direction of the stylus stroke based on the stylus coordinate direction; and
transmitting, by the controller, the determined type of the stylus stroke and the determined direction of the stylus stroke.

2. The method of claim 1, further comprising:
receiving, at the controller, drawing area coordinates of an entire drawing area inside of which the pressure sensitive stylus is able to create the stylus stroke;
determining, by the controller, the entire drawing area based on the drawing area coordinates; and
determining, by the controller, the direction of the stylus stroke within the entire drawing area based on the stylus coordinate direction.

3. The method of claim 1, wherein receiving the stylus coordinate direction from the plurality of fiber optic sensors includes:
determining a first coordinate component of the stylus coordinate direction by a first fiber optic sensor of the plurality of fiber optic sensors; and
determining a second coordinate component of the stylus coordinate direction by a second fiber optic sensor of the plurality of fiber optic sensors.

4. The method of claim 3, wherein determining the first coordinate component and the second coordinate component of the stylus coordinate direction includes sensing the first coordinate component and the second coordinate component from the write tip of the pressure sensitive stylus.

5. The method of claim 1, comprising determining a width of the stylus stroke corresponding to the pressure of the stylus stroke.

6. A pressure sensitive stylus, comprising:
a trackball located at a first end of the pressure sensitive stylus;
a first piezoelectric crystal to generate a first voltage corresponding to a pressure of a write stroke applied on the trackball;
a first fiber optic sensor to sense a first coordinate component of a stylus coordinate direction, wherein the first fiber optic sensor includes a first transmitter and a first receiver;
an erase head located at a second end of the pressure sensitive stylus;
a second piezoelectric crystal to generate a second voltage corresponding to a pressure of an erase stroke applied on the eraser head; and
a controller to receive a predetermined voltage corresponding to a pressure of a stylus stroke, determine that the stylus stroke is the write stroke performed by the trackball or the erase stroke performed by the erase head based on whether the predetermined voltage is the first voltage generated by the first piezoelectric crystal or the second voltage generated by the second piezoelectric crystal, and determine a direction of the stylus stroke based on the stylus coordinate direction.

7. The pressure sensitive stylus of claim 6, wherein the controller is to:
receive drawing area coordinates of an entire drawing area inside of which the pressure sensitive stylus is able to create the stylus stroke;
determine the entire drawing area based on the drawing area coordinates; and
determine the direction of the stylus stroke within the entire drawing area based on the stylus coordinate direction.

8. The pressure sensitive stylus of claim 6, wherein the trackball is connected to the first piezoelectric crystal by a spring and a connecting rod.

9. The pressure sensitive stylus of claim 6, wherein the controller is to determine a width of the stylus stroke based on the pressure of the stylus stroke.

10. The pressure sensitive stylus of claim 6, wherein the eraser head is connected to the second piezoelectric crystal by a spring and a connecting rod.

11. A pressure sensitive stylus comprising:
a first piezoelectric crystal to generate a first voltage corresponding to a pressure of a write stroke applied on a write tip of the pressure sensitive stylus;
a second piezoelectric crystal to generate a second voltage corresponding to a pressure of an erase stroke applied on an erase tip of the pressure sensitive stylus;
a plurality of fiber optic sensors to determine a stylus coordinate direction; and
a controller to:
receive a predetermined voltage corresponding to a pressure of a stylus stroke,
determine that the stylus stroke is the write stroke performed by the write tip or the erase stroke performed by the erase tip based on whether the predetermined voltage is the first voltage generated by the first piezoelectric crystal or the second voltage generated by the second piezoelectric crystal, and
determine a direction of the stylus stroke based on the stylus coordinate direction.

12. The pressure sensitive stylus of claim 11, wherein the controller is to:
receive drawing area coordinates of an entire drawing area inside of which the pressure sensitive stylus is able to create the stylus stroke; and
determine the entire drawing area based on the drawing area coordinates.

13. The pressure sensitive stylus of claim 12, wherein the controller is to receive the drawing area coordinates via a wireless signal frequency.

14. The pressure sensitive stylus of claim 12, wherein the controller is to:
   determine the direction of the stylus stroke within the entire drawing area based on the stylus coordinate direction and the drawing area coordinates.

15. The pressure sensitive stylus of claim 11, wherein the controller is to determine a width of the stylus stroke based on the pressure of the stylus stroke.

\* \* \* \* \*